Nov. 5, 1968  D. E. JEWELL  3,409,316
CONDUIT COUPLING
Filed Dec. 5, 1967

INVENTOR.
DAVID E. JEWELL
BY Raymond Fink
ATTORNEY

United States Patent Office 3,409,316
Patented Nov. 5, 1968

3,409,316
CONDUIT COUPLING
David E. Jewell, Littleton, Colo., assignor to The Gates
Rubber Company, Denver, Colo., a corporation of
Colorado
Filed Dec. 5, 1967, Ser. No. 688,068
8 Claims. (Cl. 285—311)

ABSTRACT OF THE DISCLOSURE

A coupling for use with flexible pipe or other type conduit wherein the coupling mechanism is a toggle actuated cam rotated inwardly and axially onto an adapter groove forcing the adapter concentrically within a coupler.

---

This invention relates to couplings but more particularly, this invention relates to quick connecting couplings to be used with flexible pipe or other type conduit.

In industries where the rapid and efficient handling of material is a key factor, there is a great need for quick connecting couplings which can be used to quickly couple and uncouple the conduits used to convey the bulk materials. A typical quick-connecting coupling utilizes a tubular female element known as a coupler and a smaller diameter tubular male element known as an adapter. The differences in tubular diameters allow the adapter to fit within the coupler and engage a seal located on a shoulder in the coupler. A fluid-tight seal is obtained when the adapter and coupler are axially brought together to effectively engage the seal. A typical mechanical means used to forcefully bring the coupler and adapter together to effect a fluid-tight seal comprises lever-actuated eccentric-cams mounted on the coupler which cams are rotated in a groove located in the adapter. The levers are usually mounted such that when they are employed, the motion of the eccentric-cam surface relative to the adapter groove tends to separate the adapter from the coupler but the eccentricity of the cam operating in the groove forces the adapter and coupler together. Large frictional forces are generated as the eccentric cam is rotated in the adapter groove. The large frictional forces make the cam levers difficult to actuate and cause excessive wear on the adapter groove and the eccentric cams which results in an inefficacious fluid-tight coupling. Eventually, the adapter must be discarded because of excessive groove wear.

It is, therefore, an object of this invention to provide a quick connecting coupler that will prolong the use of the adapter.

Another objective of this invention is to provide a coupler which can be easily coupled and uncoupled.

Still another object of this invention is to provide a quick-connecting coupling which will remain solidly and firmly in place because of lack of excessive wear after repeated and continual use.

A further objective is to provide a coupler which can be used universally with standardized adapters.

A still further objective is to provide a couple which will retain the coupler components in a substantially axial coacting configuration.

This invention fulfills the aforementioned objectives through the use of a novel toggle actuated cam mechanism mounted in a radial opening in a coupler. One element of the toggle is securely mounted to the coupler with an axial pin which thereby results in a rotatable element. Affixed to the rotating element is a lever which protrudes to the exterior of the coupler. A rotating cam for engaging the annular adapter groove is securely mounted to the coupler with an axial pin. The remaining toggle element is a floating link which connects the rotating toggle element to the rotating cam. Actuation of the lever causes the cam to rotate in the adapter groove which axially forces the coupler against a seal located in the coupler. The toggle linkage provides a high mechanical advantage system for effectively axially activating the seal to a fluid-tight condition. The over-centering characteristic of the toggle is the self-locking means for the articulated cam linkage. The mechanical characteristics of this invention will become more apparent upon review of the appended drawings.

Figure 1:
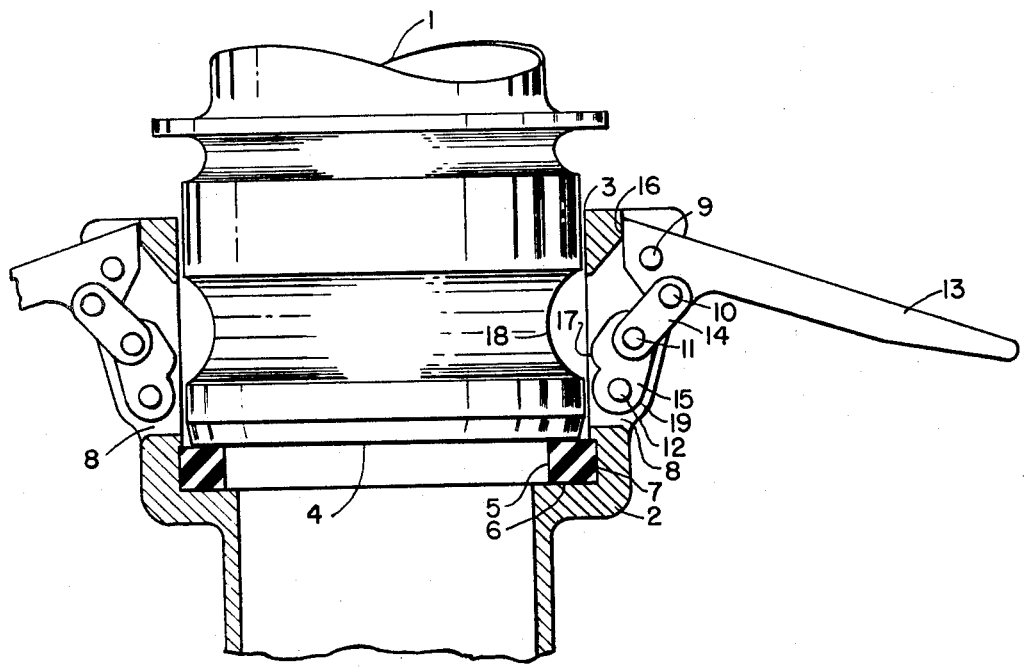
FIGURE 1 shows a standard male adapter inserted into a coupler according to the present invention in which the coupler is partially in cross section.

FIGURE 1 depicts a standard male adapter inserted into a female coupler which combination coacts to form a coupling. The adapter 1 is inserted into the coupler housing 2, which is shown as an axial cross-sectional view. The internal diameter 3 of the coupler housing 2 is such that the adapter 1 may be easily inserted. The end 4 of the adapter 1 contacts a seal 5 which seal abuts against the shoulder 6 of the coupler housing 2. An annular seal 5 is held into position by the annular groove 7 of the coupler housing 2. When the adapter 1 and the coupler housing 2 are axially brought together with sufficient force to activate the seal 5, the result is an effective fluid-tight coupling. Transmission of the required axial force is accomplished through a toggle actuated cam mechanism.

The toggle mechanism is contained in the coupler housing 2. Radial openings or apertures 8 extend through the wall of coupler housing 2. A plurality of toggle mechanisms and corresponding apertures 8 may be used but only two are shown for the purpose of illustration. Four axial pins 9, 10, 11 and 12, are used in the articulated linkage. Pins 9 and 12 are securely mounted to the coupler housing 2 whereas pins 10 and 11 may move relative to the coupler housing 2 via the articulated linkage. For the purpose of explanation, let the linear element between pin 9 and pin 10 be represented by "element 9–10." Affixed to element 9–10 is the lever 13 such that when lever 13 is moved, element 9–10 rotates about stationary pin 9. The toggle linkage consists of element 9–10 and floating link 14. Floating link 14 is affixed to element 9–10 with pin 10, and floating link 14 is affixed to cam 15 with pin 11. When lever 13 is moved, the cam 15 rotates about stationary pin 12 via the toggle linkage. The toggle actuated cam linkage is shown in the open position in FIGURE 1. Movement of lever 13 is limited in the open position by a stop 16 which is part of the coupler housing 2. When the lever 13 is in the full open position against stop 16, the cam 15 is in such a position that the adapter 1 may be inserted into the coupler housing 2.

Figure 2:
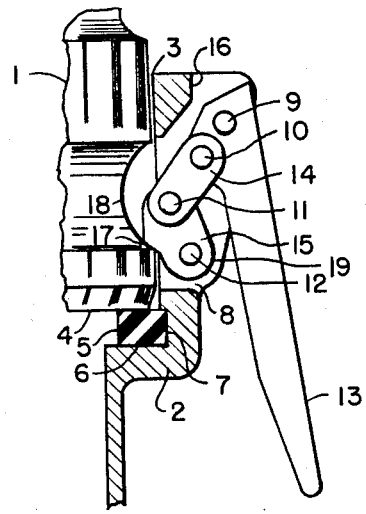
FIGURE 2 shows a view of the toggle linkage on a coupler according to the invention in which the linkage is on the approximate "on-center" position.

FIGURE 2 is illustrative of the maximum linear extension of the toggle linkage, the "on-center" position, which occurs as the lever 13 is rotated clockwise. The on-center position occurs when pins 9, 10 and 11 form a theoretical straight line. The change in linear distance between pin 9 and pin 11 which occurs when the lever 13 is rotated clockwise to the on-center position, causes the cam 15 to rotate counterclockwise to its maximum position. As the cam 15 is rotated counterclockwise, the cam surface 17 engages the annular groove 18 of the adapter 1 and axially forces the end 4 of the adapter 1 against the seal 5 to compress said seal 5. Though any resilient or compressible ring will add to a fluid-tight seal, a lip seal ring with a concave inner peripheral configuration and having compression ridges on the end surfaces of the ring will more effectively provide a sealing action between the end of the adapter and the coupler sealing shoulder.

Figure 3:
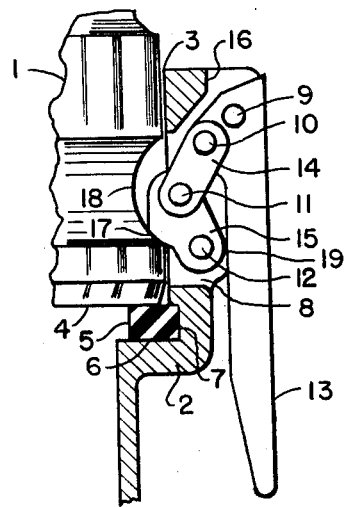
FIGURE 3 shows the toggle linkage according to the coupler of the present invention in which the linkage is in a "beyond-center" position with the linkage completely locked.

Continued clockwise rotation of the lever 13 causes the toggle linkage to go "beyond-center" which is illustrated by FIGURE 3. When the toggle linkage goes beyond-center, the cam 15 reverses its original direction of rotation and rotates clockwise thereby slightly reducing the coupling force produced between the cam surface 17 and the adapter groove 18. Rotation of the lever 13 is terminated when it contacts the extremity 19 of the cam 15. The toggle linkage will remain locked because of the beyond-center position until lever 13 is rotated counterclockwise.

The number of toggle mechanisms necessary for the coupled system as embodied by this invention depends generally upon the diameter of the coupling. It has been found that for couplers up to a diameter of four inches, two toggle mechanisms will suffice. For better distribution of the axial thrust generated, additional toggle mechanisms may be added. On the other hand, some systems for the conveyance of solid materials such as grain and powders need not be absolutely fluid-tight. For such applications, a single articulated toggle linkage will be sufficient with a diametrically positioned cam shaped projection to seat within the adapter groove 18. With such a configuration the single toggle mechanism will create the axial thrust necessary and the radial vector force created by the activation of the linkage will not only create a positive holding of the adapter within the coupler but will create sufficient axial thrust to accomplish substantially fluid-tight fitting at least sufficient for flow of solid material.

The foregoing detailed description has been given for the purposes of illustration only and is not intended to limit the scope of the present invention which is to be determined from the appended claims.

What is claimed is:

1. A coupling for connecting conduit ends in a fluid-tight relation comprising: a coupler housing; peripheral radial apertures extending through said housing; lever actuated toggle mechanisms pivotally connected to said housing at said apertures, rotatable cams pivotally connected to said housing at said apertures, said cams having a cam profile surface capable of being extended through said apertures; floating toggle links having end portions with one end pivotally connected to said cams and the other end pivotally connected to said lever actuator; a seating shoulder disposed within said coupler housing; an adapter having an axial sealing surface; a cam receiving annular groove circumferentially disposed around the outer periphery of said adapter disposed from said sealing surface such that the cam surface of said cams coact within said grooves such that when the lever actuators are pivoted, the adapter is forced axially within said coupler.

2. A coupler according to claim 1 in which the radius of curvature of said cam is complementary to the radius of curvature of said annular groove.

3. A coupling according to claim 1 in which a resilient lip seal is disposed between said adapter sealing surface and said coupler seating shoulder.

4. In combination with a tubular male adapter having a seating end and an annular groove to receive a locking member; a tubular female coupler having an internal sealing shoulder therein; a plurality of lever actuated toggle mechanisms pivotally mounted in apertures formed in the wall of said coupler; cam means pivotally mounted in the apertures displaced from the mounting means of the lever actuators; floating toggle links pivotally connected at one end to said lever actuators and at another end to said cams to form an articulated toggle mechanism whereby when the lever actuators are moved, the floating toggle link forces said cams axially downward into complementary relation with said anular groove to axially force the male adapter into fluid-tight relation into said female coupler.

5. A coupling for connecting conduit ends in a fluid-tight relation comprising: a coupler having one end connected to a conduit; a tubular housing extending from said connected end; peripheral radial apertures extending through said housing at a free end of said coupler; rotatable cams pivotally connected to said housing axially disposed from said connected end of coupler, said cams having a cam profile surface capable of being extended through said apertures and said cam surface having a radius of curvature presenting a convex profile and an inner diametric profile having a convex surface; lever actuated toggle mechanisms pivotally connected to said housing at said radial apertures; floating toggle links having end portions with one end pivotally connected to said lever, actuated at the free end of said housing apertures and another end pivotally connected to said cams axially disposed from the connected end of said housing apertures; a seating shoulder circumferentially disposed within said coupler housing; an adapter having one end connected to a conduit end and another free end having an axial sealing surface; a cam receiving annular groove circumferentially disposed around the outer periphery of said adapter, said annular groove disposed from said sealing surface such that actuation of the lever actuators forces said cams inwardly through said apertures and down onto said annular groove forcing said adapter in an axial direction to firmly press the adapter sealing surface aaginst said coupler seating shoulder.

6. In combination with an adapter for connecting conduit ends to form a fluid-tight seal, a coupler comprising: a coupler housing; radial openings extending through the housing; lever actuated toggle mechanisms pivotally affixed to the housing at said radial openings; rotatable cams pivotally connected to said housing at said radial openings, said cams capable of being rotated internally within said housing; floating toggle links pivotally connected at one end to the lever actuated link and at the other end to the rotatable cams, said cams having a profile such that when the cam is rotated internally into the housing, the cam contacts the adapter and forces the adapter into the coupler in an axial direction.

7. A coupler for use with an adapter which coupler and adapter coact to form a fluid-tight coupling through a seal restrained by the coupler and wherein the coupling means comprises at least one toggle actuated cam mechanism mounted in a radial opening in the coupler, said cam mechanism comprising: a toggle element pivotally mounted to the coupler with an axial pin; an actuation lever affixed to the pivoting toggle element which lever protrudes to the exterior of the coupler; a rotating cam for engaging a surface on the adapter which cam is secured to the coupler with an axial pin; a floating toggle link which connects the pivoting toggle element to the rotating cam with axial pins.

8. A coupling for connecting end portions of conduits comprising: a coupler having one end connected to a conduit; a tubular housing extending from said connected coupler end; a radial aperture extending through said housing; a lever actuated toggle mechanism pivotally affixed to said housing at a free end of said coupler; a rotatable cam pivotally connected to said housing axially disposed from said connected end of said coupler, said cam having a cam profile surface capable of being extended through said opening; a floating toggle link having end portions with one end pivotally connected to said lever actuator at the free end of said housing aperture and another end pivotally connected to said cam axially disposed from the connected end of said housing aperture; an arcuate sector rib portion substantially diametrically situated from said aperture on the inner periphery of said housing; an adapter having one end connected to a conduit end and another free end having an axial abutting surface; a cam receiving annular groove circumferentially disposed around the outer periphery of said adapter, said annular groove disposed from said sealing surface such that movement of the lever actuator forces said sector rib portion into said annular groove and forces said cam inwardly through said aperture and down onto said annular groove, forcing said adapter in an axial direction within said coupler.

References Cited

UNITED STATES PATENTS

| | | | |
|---|---|---|---|
| 569,801 | 10/1896 | Post | 285—130 |
| 2,617,312 | 11/1952 | Prentice | 74—520 |
| 3,052,450 | 9/1962 | Trunnell | 285—322 X |
| 3,124,374 | 3/1964 | Krapp | 285—322 X |
| 3,142,199 | 7/1964 | Burton et al. | 74—520 X |
| 3,268,249 | 8/1966 | Owens | 285—312 |
| 3,278,205 | 10/1966 | Barlow | 285—311 |
| 3,323,381 | 6/1967 | Jinasena et al. | 74—106 |

FOREIGN PATENTS

| | | |
|---|---|---|
| 854,763 | 11/1960 | Great Britain. |

CARL W. TOMLIN, *Primary Examiner.*

W. L. SHEDD, *Assistant Examiner.*